July 1, 1952     F. O. ANDEREGG     2,601,905
DEHUMIDIFICATION SYSTEM FOR BUILDINGS
Filed March 2, 1948
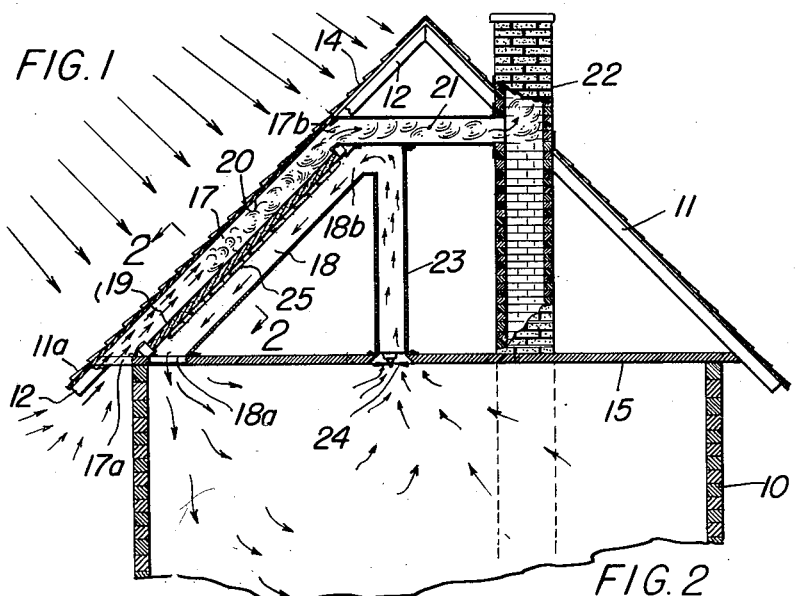
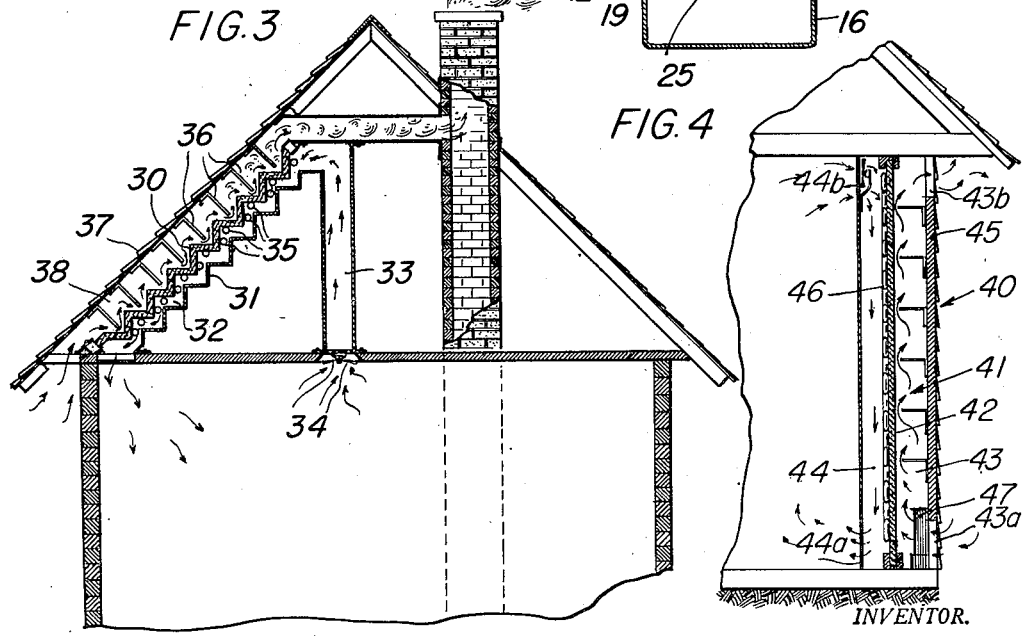
INVENTOR.
Frederick O. Anderegg Patented July 1, 1952

2,601,905

UNITED STATES PATENT OFFICE 2,601,905

DEHUMIDIFICATION SYSTEM FOR BUILDINGS

Frederick O. Anderegg, Somerville, N. J., assignor to John B. Pierce Foundation, New York, N. Y., a special corporation of New York Application March 2, 1948, Serial No. 12,673

5 Claims. (Cl. 183—4.5)

This invention relates to dehumidying systems, and particularly to those used in buildings for conditioning the interior air thereof.

In my U. S. Letters Patent No. 2,336,456 there is disclosed dehumidifying apparatus utilizing a pervious, porous wall between a flow of air to be dehumidified and a flow of heated air, a cooling coil being disposed at that surface of the pervious, porous wall against which the air to be dehumidified impinges. Thus, the fugacity of the moisture laden air is lowered and the latent heat of vaporization absorbed by the cooling coil. Moisture condenses upon the pervious, porous wall, is passed through the pores to the heated air stream, and is carried away thereby.

In the present system substantially the same dehumidifying principle is employed in a new structural combination which affords rapid and effective dehumidification and conditioning of air within a building.

In its most preferred form, the system of the invention embodies an elongate panel section in the roof or other part of the exterior frame structure of a building, for directing the heat of the sun into one channel of an air-flow conduit of which the said panel section forms the exterior wall. The air-flow conduit is divided longitudinally into exteriorly-disposed and interiorly-disposed channels by a moisture-pervious, porous wall, and opposite ends of the exteriorly-disposed channel are open to the outside atmosphere while opposite ends of the interiorly-disposed channel are open to the inside atmosphere of the building. Forced-circulation means is provided for the interiorly-disposed channel, but heat is relied upon to effect circulation of outside air through the exteriorly-disposed channel. The heat is advantageously derived from the sun by utilizing a heat conductive sheet or plate, preferably blackened sheet copper, for the elongate panel section above mentioned. Cooling means, preferably in the form of a serpentine pipe which circulates cool water, is provided at and along the face of the porous wall within the interiorly-disposed channel.

Generically speaking, the system of the invention may be regarded as embodying an air-flow conduit which extends up and down within the exterior frame structure of a building and which is divided longitudinally into a pair of flow channels by a moisture-pervious, porous wall. Opposite ends of one of the flow channels are open to the outside atmosphere, and opposite ends of the other flow channel are open to the interior of the building.

Among the objects of the invention are:

To provide an efficient and economical dehumidification and air conditioning system for buildings;

To incorporate such a system in the exterior framework of a building in order to utilize otherwise waste space;

To effect adequate dehumidification and comfort cooling of the air within a building while continuously regenerating the dehumidifying material;

To make use of the heat of the sun in the regenerative process.

Additional objects and features of the invention will become apparent from the following detailed description of the preferred embodiments illustrated in the accompanying drawing.

In the drawing:

Fig. 1 is a transverse vertical section taken through a building in which a preferred form of the invention is incorporated, the dehumidifying system appearing in longitudinal vertical section;

Fig. 2 is a fragmentary transverse section taken on the line 2—2, Fig. 1;

Fig. 3 is a view corresponding to that of Fig. 1, but illustrating a somewhat different form of the dehumidifying system; and Fig. 4 is a vertical section taken through an exterior wall of a building with which another form of the invention is incorporated, the dehumidification system appearing in longitudinal vertical section, and the whole being drawn to a reduced scale as compared with the foregoing figures.

Referring now to the drawing, and particularly to Figs. 1 and 2 thereof, wherein the dehumidification system is incorporated in the roof structure of a building:

The illustrated dwelling house 10 is merely indicative of one type of building to which the invention is applicable. The roof structure 11 thereof is of conventional construction, embodying spaced rafters 12 covered by any desired type of sheathing 13 and external roofing 14, see Fig. 2. A ceiling is shown at 15.

In this embodiment, the dehumidification system of the invention comprises an air-flow conduit 16 divided longitudinally into a pair of flow channels 17 and 18, respectively, by means of a moisture-pervious, porous wall 19. The flow channel 17 is exteriorly disposed, while the air-flow channel 18 is interiorly disposed, the air-flow conduit 16, as such, being built into the external framework of the building, specifically into the framework of the roof structure, as illustrated.

The air-flow conduit 16 is closed exteriorly by blackened sheet copper 20, which provides, in effect, an elongate panel section running up and down the roof structure and exposed to the sunlight.

The exteriorly-disposed flow channel 17 has open ends 17a and 17b which communicate with the outside atmosphere, the lower open end 17a being disposed under the eaves 11a of the roof, and the open end 17b having its communication with the outside atmosphere by way of a flow channel extension 21 and a flue of a chimney 22.

The interiorly-disposed flow channel has open ends 18a and 18b which communicate with the interior of the building, the lower open end 18a communicating through the ceiling 15 and the upper open end 18b communicating by way of a depending flow channel extension 23.

A fan 24 is mounted in the flow channel extension 23 for the purpose of forcing circulation of air upwardly therethrough and back downwardly through the main flow channel 18, as illustrated by the appended arrows. Upward circulation of the outside atmosphere through flow channel 17, flow channel extension 21, and the flue of chimney 22 is accomplished by natural draft, and such air is heated by means of the sun's rays caught and transmitted to the flowing air stream by the blackened copper sheet 20.

Disposed at and extending along the face of moisture-pervious, porous wall 19 is a serpentine coil of piping 25, through which cool water is circulated from any suitable source, such as the cold water supply to the building proper.

The interior air to be dehumidified and comfort conditioned is sucked into flow channel extension 23 and is passed downwardly through flow channel 18 by means of the air-circulating fan 24. In passing, it impinges against the cooling coil 25, whereby its fugacity is lowered and any excess moisture which it carries is condensed upon the moisture-pervious, porous wall 19. Thereby relieved of its excess moisture, such circulated air passes back into the interior of the building.

The condensed moisture permeates the moisture-pervious, porous wall 19, passing through the pores thereof to the opposite face, which is constantly scrubbed by the heated outside air passing upwardly through the flow channel 17. As the moisture appears at the said opposite face of the moisture-pervious, porous wall 19, it is taken up and carried away by the flowing stream of outside air. Accordingly, the moisture-pervious, porous wall 19, which is the dehumidifying agency of the combination, is constantly and automatically regenerated. The process is a very simple one, depending entirely upon natural phenomena for performance.

It has been found that a 20° temperature differential between opposite faces of the moisture-pervious, porous wall 19 is the optimum for best results. This can be achieved by regulating the temperature of the cooling medium flowing through the piping 25.

In some instances it is advantageous to provide irregular paths of flow for the air streams, which, as appears from the drawing, are countercurrent. In this way more intimate contact with the moisture-pervious, porous wall can be attained. Thus, as illustrated in Fig. 3, the moisture-pervious, porous wall 30, and the corresponding interior wall 31 of the interiorly-disposed flow channel 32, are correspondingly corrugated transversely of their lengths, and moisture-laden interior air brought to the flow channel 32 by the depending flow channel extension 33 and fan 34 is made to vigorously impinge against the cooling coil 35 and that face of moisture-pervious, porous wall 30 lying within the flow channel 32. Furthermore, a series of baffle plates 36 secured at the inner surface of the exterior wall or panel member 37 of exteriorly-disposed flow channel 38, extends inwardly of such flow channel and into troughs of the moisture-pervious, porous wall 30. These baffle plates serve to force the upwardly-flowing, regenerative air vigorously against the exterior face of moisture-pervious, porous wall 30.

In Fig. 4 is illustrated a somewhat different embodiment of the invention, wherein the dehumidification system is placed within the framework of an exterior wall 40 of the building. The air-flow conduit 41 extends upwardly between spaced studs of the wall framework, and is divided longitudinally by a moisture-pervious, porous wall 42 so as to provide a pair of flow channels 43 and 44. The flow channel 43 has its opposite ends 43a and 43b open to the outside atmosphere through the exterior wall surfacing 45, and the flow channel 44 has its opposite ends 44a and 44b communicating with the interior of the building. As in the foregoing embodiment, a cooling coil 46 is provided at and along the face of the moisture-pervious, porous wall 42 within the flow channel 44, so that the moisture-laden interior air is relieved of its moisture. Also, a fan is provided at the upper open end 44b of the flow channel 44.

While an elongate, exterior panel of blackened copper or other suitable sun-heat concentrating material may be employed in this embodiment, as in the foregoing embodiment, there is here illustrated another manner of heating the outside air flowing through the flow channel 43. An electric heater 47 is disposed at the lower open end 43a of flow channel 43 so as to heat and appreciably dry the exterior air as it enters the flow channel. Any other source of heat, or waste heat, might be utilized for this purpose.

The action of this embodiment of the invention is essentially similar to that of the foregoing embodiments.

While many types of moisture-pervious, porous material may be utilized for the dividing wall in the air-flow conduit of the several embodiments of the invention, is it preferred to employ the material known to the trade as "Microporite," which is fully disclosed in U. S. Patent No. 1,932,971 issued October 31, 1933, to Huttemann et al., entitled "Method of Making Light Weight Block," or the similar specially treated dehydrating material of my U. S. Patent No. 2,005,401, issued September 9, 1941, entitled "Dehydrating Material." These materials in their lightest form give best results. Gypsum, Portland cement and ceramic products having continuous pore systems may also be used.

Obviously suitable cooling means, heating means, and air-circulating means other than those specifically illustrated may be substituted for those shown, and an electric heater or other heating means may be used to supplement the sun-heat panel of the embodiments of Figs. 1 and 3, if desired.

Whereas the invention is here illustrated and described with respect to particular preferred forms thereof, it should be understood that various changes may be made therein and various other forms may be constructed on the basis of the teachings hereof by those skilled in the art without departing from the generic scope of the invention as defined by the following claims.

I claim:

1. A dehumidification system for buildings, comprising an air-flow conduit extending up and down within the exterior frame structure of the building, said conduit being divided longitudinally by a moisture-pervious, porous wall to define exteriorly and interiorly disposed flow channels, the exteriorly disposed channel having its opposite ends open to the outside atmosphere and its exterior wall exposed so as to be heated by sunlight, said exterior wall being of heat-conductive material, and the interiorly disposed channel having its opposite ends open to the interior of the building; a fan for circulating interior air through said interiorly disposed channel; and cooling means within said interiorly disposed channel disposed at and extending along the face of the said porous wall.

2. The combination recited in claim 1, wherein the air-flow conduit extends between two adjacent rafters in the roof structure of the building.

3. The combination recited in claim 2, wherein the exteriorly disposed channel opens to the atmosphere under the eaves of the roof, and through a chimney flue.

4. The combination recited in claim 3, wherein the moisture-pervious, porous wall and the opposite wall of the interiorly disposed channel are correspondingly corrugated transversely of their lengths, and wherein a series of baffles extend interiorly from the exterior wall of the exteriorly disposed channel into the troughs of the corrugations of the moisture-pervious, porous wall.

5. The combination recited in claim 1, wherein the exterior wall of the exteriorly disposed channel is blackened sheet copper.

FREDERICK O. ANDEREGG.

REFERENCES CITED

The following references are of record in the file of this patent:

UNITED STATES PATENTS

| Number | Name | Date |
| --- | --- | --- |
| 1,830,412 | Stark | Nov. 3, 1931 |
| 1,966,034 | Hensler | July 10, 1934 |
| 2,138,690 | Altenkirch | Nov. 29, 1938 |
| 2,138,691 | Altenkirch | Nov. 29, 1938 |
| 2,185,760 | Altenkirch | Jan. 2, 1940 |
| 2,223,586 | Thomas | Dec. 3, 1940 |
| 2,336,456 | Anderegg | Dec. 14, 1943 |
| 2,478,617 | Anderegg | Aug. 9, 1948 |
| 2,462,952 | Dunkak | Mar. 1, 1949 |

FOREIGN PATENTS

| Number | Country | Date |
| --- | --- | --- |
| 409,652 | Great Britain | July 29, 1932 |